Nov. 15, 1960 D. C. BROUGHTON ET AL 2,960,350
VEHICLE SHOCK ASSEMBLY
Filed July 26, 1957 3 Sheets-Sheet 3

INVENTORS.
DEAN C. BROUGHTON
ERWIN G. DUERINGER
HOWARD R. PRICE
BY
*Andrus, Sceales + Starke*
ATTORNEYS

United States Patent Office 2,960,350
Patented Nov. 15, 1960

2,960,350

VEHICLE SHOCK ASSEMBLY

Dean C. Broughton, Milwaukee, and Erwin G. Dueringer, Bayside, Wis., and Howard R. Price, Whittier, Calif., assignors to A. O. Smith Corporation, Milwaukee, Wis., a corporation of New York Filed July 26, 1957, Ser. No. 674,415

1 Claim. (Cl. 280—136)

This invention relates to vehicle shock assemblies and particularly to the suspension of the vehicle body on the rolling wheels.

Normally, the suspension assembly for rolling vehicles includes means to absorb the shock which arises due to uneven road conditions and to thereby give a more comfortable and smoother ride. Springs have been the conventional form of shock absorbers for many years. Recently, fluid cushioning and rubber-like members have been employed in shock absorbing units.

In accordance with the present invention, successively operable resilient stacks of O-rings having a rectangular cross-section separate the body of the vehicle from the wheels. As the load increases, the number of stacks engaged increases to establish respectively soft and firm resilient support for light and heavy loads. The stacked O-rings are separated from each other by a metal bearing member to force each of them to act individually of the others. Further, in accordance with the present invention, the lateral expansion and contraction of the resilient means is unrestrained. The shape factor of the rubber may thus be employed in the design and development of any particular assembly.

The resilient O-rings are disposed within a suitable support means which is preferably formed integrally with the axle of the vehicle. This permits both a simplification in the construction of the total assembly and a reduction in the total weight of the assembly. The weight of the assembly is particularly important for vehicles which are for hire. For example, most roads have a total weight limit for vehicles which may travel thereon. If the weight of the vehicle alone is reduced, then, of course, the pay load which is carried by the truck can be increased accordingly.

In another aspect of the present invention, a lateral bearing and shock absorbing surface is radially moved to the outermost portion of the shock assembly to provide maximum stability.

The present invention provides a simply and easily fabricated shock assembly having improved shock absorbing characteristics and stability.

The accompanying drawings illustrate the best mode presently contemplated by the inventor for carrying out the invention:

Figure 1:
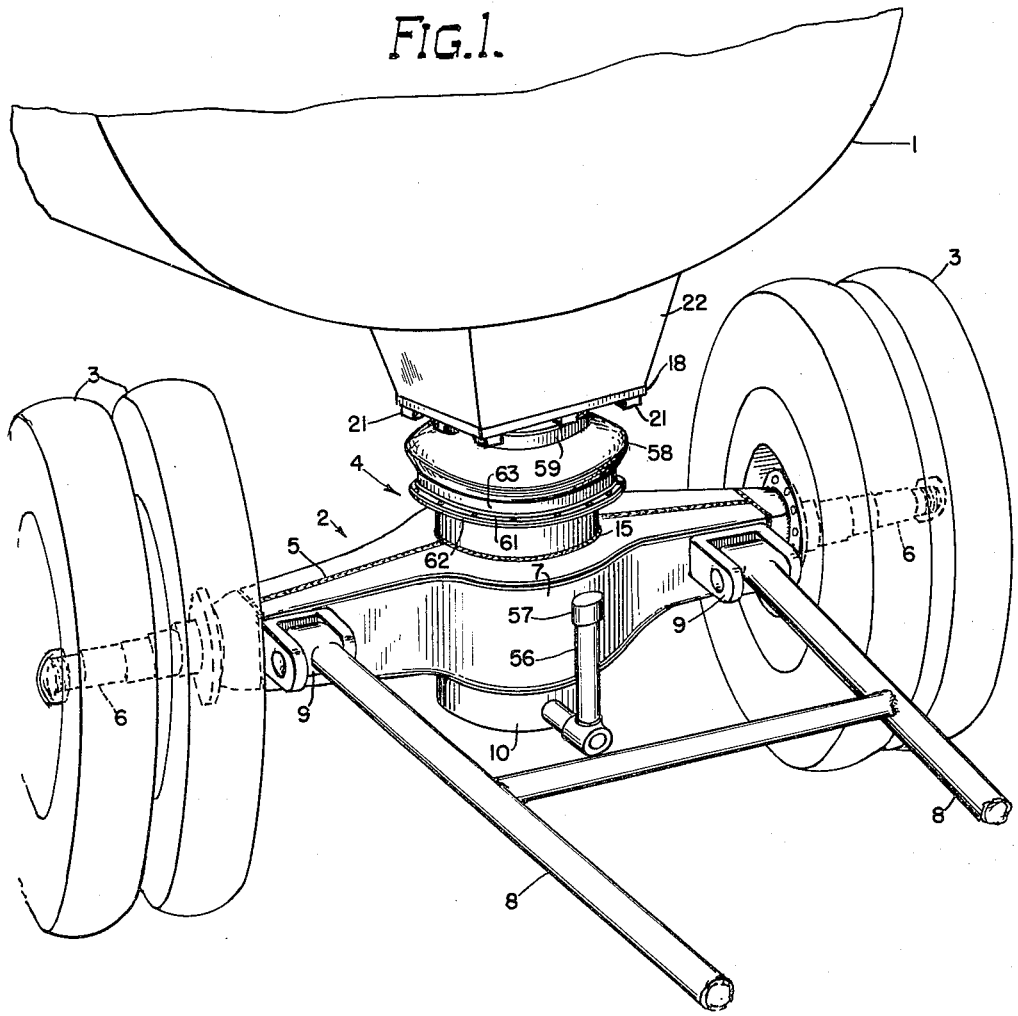
Figure 1 is a perspective view of the forward portion of a trailer employing a front wheel suspension made in accordance with the present invention.

Referring to the drawings and particularly Figure 1, the illustrated embodiment of the invention generally comprises a trailer body 1, of which only the forward portion is shown, supported on a turnable front axle 2. Pairs of front wheels 3 are rotatably secured to opposite ends of the axle 2 to permit transporting of the body 1.

A shock assembly 4 joins the body 1 to the axle 2 and is constructed to absorb vertical and lateral shock arising during the transporting of the trailer.

The axle 2 comprises a pair of channel members disposed in abutting relation with an upper and a lower longitudinal weld 5 securing them together to form a box member. Supporting studs 6 of any suitable variety are welded one to each end of the axle 2 and rotatably support the front wheels 3. The central portion of the axle 2 is horizontaly enlarged as at 7 and centrally apertured to accommodate the shock assembly 4 and form a unitary axle and shock assembly therewith. This construction reduces the total weight of the front axle and shock assembly to a minimum and permits higher pay loads to be carried by the trailer.

A pair of draft members 8, by which the trailer 1 is pulled behind a truck or other movable vehicle, not shown, are secured to the axle 2 adjacent each of the front wheels by pivotal connector means 9.

Figure 2:
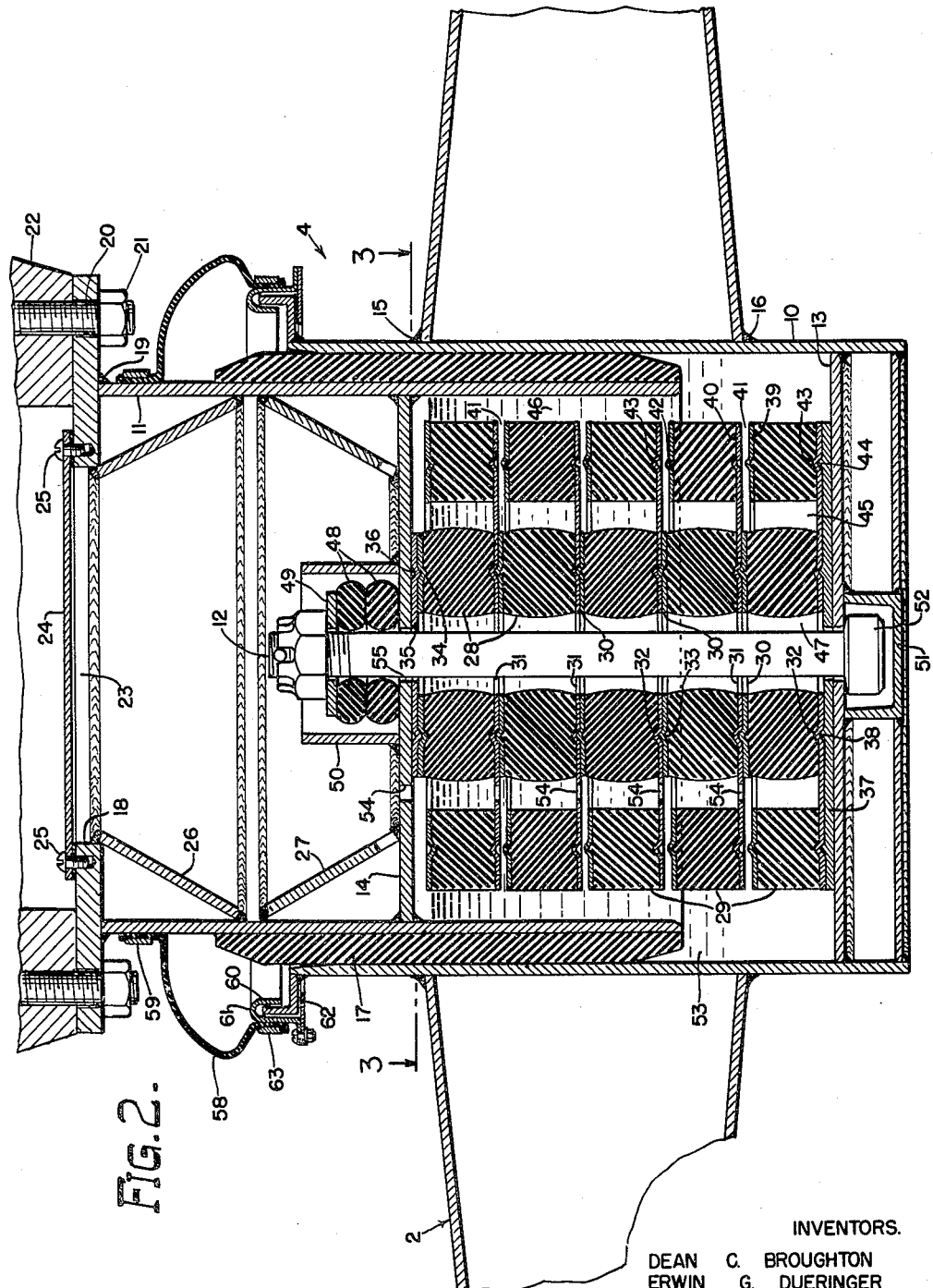
Figure 2 is a fragmentary vertical section through the front axle and shock assembly shown in Figure 1.
Figure 3:
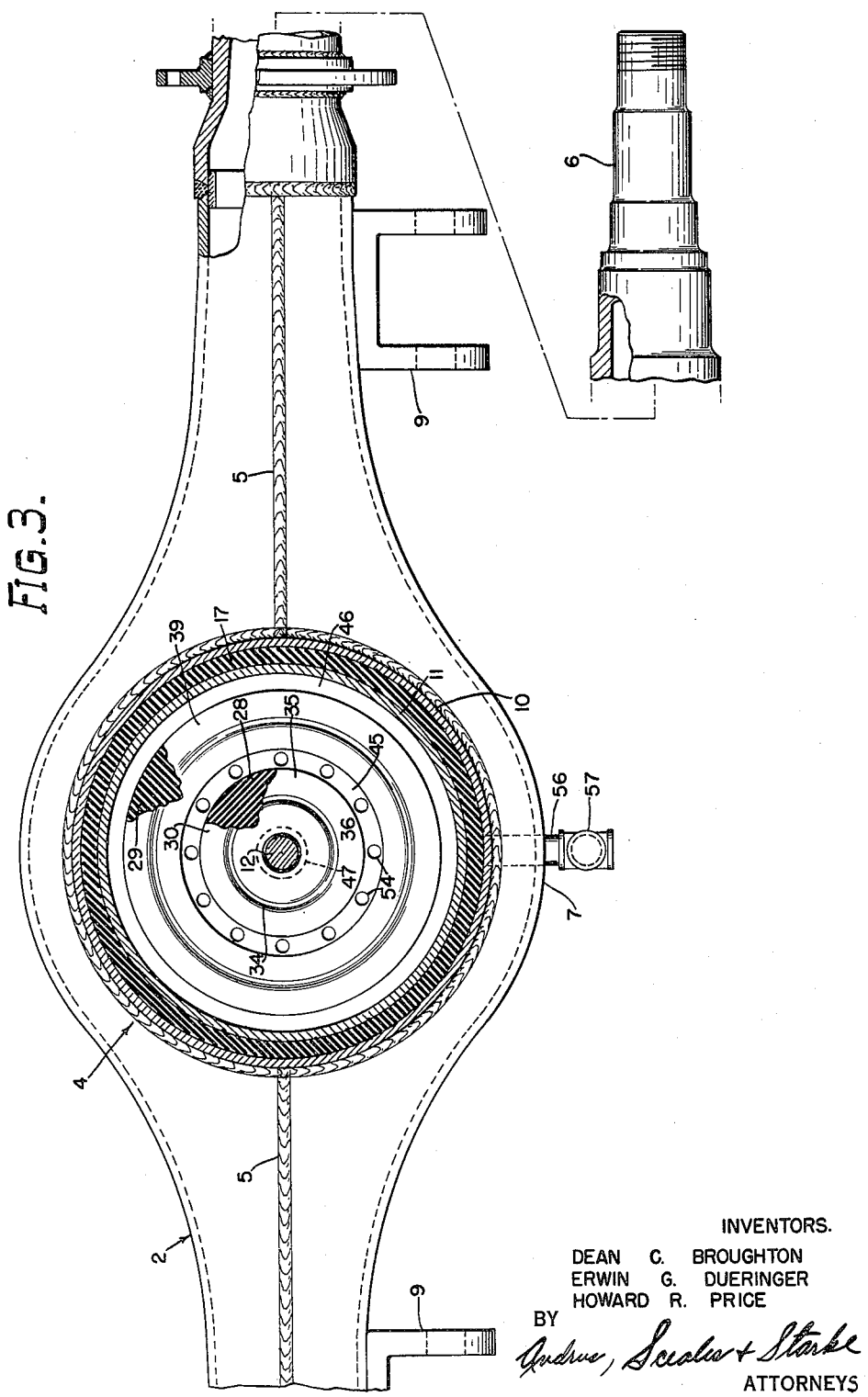
Figure 3 is fragmentary section taken on line 3—3 of Fig. 2.

Referring particularly to Figures 2 and 3 for a showing of the shock assembly, the shock assembly 4 comprises a lower cylinder 10 and an upper cylinder 11 disposed in telescoped relation. A king pin 12 extends through suitable openings in the center of an intermediate plate 13 welded to cylinder 10 and an intermediate plate 14 welded to cylinder 11 to maintain the cylinders in telescoped relation.

The lower cylinder 10 extends through the opening in the axle 2 and is rigidly secured to the axle by an upper circumferential weld 15 and a lower circumferential weld 16 to form a unitary construction. A horizontal force applied to the draft member is transmitted via the axle 2 and the lower cylinder 10 to the upper cylinder 11, which is removably secured to the body 1. A resilient sleeve bearing 17, formed of neoprene or other suitable material, is disposed between the telescoped members. The sleeve bearing 17 is adhesively bonded to the cylinder 11 and is chamfered at its upper and lower edges and to permit easy assembly of the telescoping members. Bearing member 17 permits relative rotation of the two cylinders 10 and 11 to allow steering of the trailer by rotation of the draft member 8 and absorbs radial shock which arises when a radial force is established between cylinders 10 and 11.

To allow securing of the upper cylinder 11 to body 1, an upper mounting plate 18 is rigidly secured to the top edge of cylinder 11 by a circumferential weld 19. The mounting plate 18 is provided with a plurality of bolt openings 20 which are disposed outwardly of the cylinder 11. Bolts 21 extend through the openings 20 and thread into a vertically depending body support 22 which is secured to the forward portion of the trailer body 1.

A central opening 23 in the plate 18 permits access to the interior of the cylinders for making repairs and the like. Dust and foreign matter is prevented from entering through the opening 23 by a cover 24 which is secured over the opening by a plurality of screws 25.

The upper portion of cylinder 11 above plate 14 is braced by a pair of back-to-back tubular frusto-shaped braces 26 and 27. The narrow ends are welded respectively to the edge of the opening 23 in plate 18 and to the upper surface of plate 14 and the wide ends are welded to the inner surface of the upper cylinder 11.

The weight of body 1 including any load therein which is apportioned to the front wheels is transmitted directly to the upper cylinder 11. This weight causes cylinder 11 to move into cylinder 10 against the force of two concentrically arranged stacks of resilient O-ring members 28 and 29 respectively.

The stacks of members 28 and 29 concentrically encircle the kingpin 12 and rest on the plate 13 at the lower portion of cylinder 10. The plate 14 of upper cylinder 11 is adapted to bear on the upper surfaces of the stacks of members 28 and 29 to support the cylinder 11 in vertically extended relation with respect to the lower cylinder 10.

The inner members 28 are each an individual O-ring member having a rectangular cross section and are formed of neoprene rubber or similar material having the desired degree of resiliency to support the weight of body 1 including any loads therein which is apportioned to the front wheels.

The cross-sectional configuration, as shown in Fig. 2, establishes a wide area to distribute the load and therefore maintains a relative low unit loading under all load conditions.

Each of the members 28 has stamped metal facings 30 and 31 secured respectively to its upper face and to its lower face to establish a sandwich or laminated construction. The metal faces are securely bonded to the O-ring members to prevent fluid flow of the mating facings of the O-ring members. Consequently, each member 28 separately expands radially outwardly between the planes defined by the metal facings 30 and 31 while maintaining bonded contact to the metal facings. Each of the members 28 is then acting as an entirely separate resilient member. Consequently, a very predictable deformation pattern can be established and the pattern is reproduceable for long periods of time.

An annular groove 32 is formed in each lower metal facing 31 and a radially aligned annular ridge 33 is formed in each upper metal facing 30 except for that of the uppermost of the members 28. The adjacent grooves 32 and ridges 33 mate to lock the stacked members against relative lateral movement.

The upper facing of the uppermost member 28 is provided with an annular groove 34. An upper bearing member 35 is rigidly secured to the lower surface of the plate 14 in alignment with the adjacent facing 30 and is provided with a depending ridge 36 in mating alignment with the groove 34. A lower thrust bearing plate 37 is secured to the upper surface of plate 13 of cylinder 10 and is provided with an annular ridge 38 which mates with the annular groove 32 in the lowermost of the members 28. The individual members 28 are thus nested together with the mating grooves and the ridges holding them against lateral displacement.

The outer stack of resilient members 29 includes the same number of individual members as the inner stack. Each of the members 29 also has a rectangular cross-section and is formed of neoprene or similar material. However, the vertical depth of the individual members 29 is slightly less than the vertical depth of the individual members 28.

As with the inner members 28, the outer members 29 each have an upper metal facing 39 and a lower metal facing 40. The lower metal facing 40 is integrally formed with the lower metal facing 31 to maintain the radial positioning of the members 29 and to support the individual members 29 with a vertical spacing 41 therebetween when no load, or a light load is on body 1. An annular ridge 42 is formed in each of the upper metal facings 39 except for the uppermost one of the members 29. A mating annular groove 43 is provided in each of the lower metal facings 40 to provide a nesting relation between the individual ring members 29 under heavy loads. The lower bearing plate 37 extends radially outwardly coextensively with the outer stack 29 and is provided with a ridge 44 aligned with the adjacent groove 43 in facing 40 of the lowermost member 29.

Under light loads or no load on the trailer body 1, the plate 14 bears on the inner stack of members 28 and places the individual members 28 under compression. The members 28 are deformed, as shown in Fig. 2, and take up the vertical shock which arises due to uneven road conditions and the like.

As the load on the trailer body increases, the outer resilient members 29 are also placed under a compressive force and radially expanded or deformed. Due to the common or integral connection of the lower metal facings 31 and 40, the outer resilient members 29 are drawn together and eventually close the spaces 41. As the load increases, the outer stack of members 29 is also deformed and take up a portion of the load. Thus, under empty or light loads on the trailer body 1, the inner stack of resilient members 28 alone support the trailer body 1 and the load thereon which is apportioned to the front wheels 3 on a relatively small area. This provides a smoother and softer ride than if both the inner and outer stacks of members 28 and 29 were in action. As the load increases, however, the second stack of members 29 are brought into action and increases the area of the shock absorbing medium. This reduces the unit loading on the shock absorbing surface and also reduces the tendency of the resilient members 28 and 29 to permanent set.

The outer stack of members 29 is radially spaced from the inner stack of members 28 by a space 45 and from the wall of cylinder 11 by a space 46 and the inner stack of members 28 is spaced from the king pin 12 by a space 47 to allow unrestricted radial deformation of the individual resilient members 28 and 29 under load and shock forces. The unrestricted deformation allows a greater deflection of the members after rated load on the trailer 1 and thereby provides a smooth ride. Further, if the O-rings were confined by vertically disposed restraining surfaces, the frictional forces therebetween would vary with the degree of lubrication and the temperature as well as the finish of the surfaces. This of course would vary the load deflection curve and result in poor reproduction of the load pattern.

To absorb upward shock movement of cylinder 11, a pair of vertically stacked O-rings 48 encircle the king pin 12 between the intermediate plate 14 and a king pin washer 49. The O-rings 48 are normally in a semi-compressed state and resiliently cushion upward shock movement of cylinder 11. Tubular extension 50 is secured to the upper surface of intermediate plate 14 and encircles the O-rings 48 in radially spaced relation thereto.

A cup-shaped member 51 encloses the head 52 of king pin 12 to seal the cylinder 10 and retain a lubricating fluid 53 within the cylinders 10 and 11 to provide lubrication of the shock absorbing components. The reciprocating movement of the cylinders 10 and 11 effects a pumping action of the oil and insures proper lubrication of the components within the assembly. Vertically aligned apertures 54 are provided in the integral connection of each of the lower metal facings 31 and 40 and in plate 14. The aligned apertures 54 allow free vertical flow of the lubricating fluid 53 between the members 28 and 29 at all times and prevent creation of a hydraulic lock therebetween when plate 14 engages the adjacent outer member 29 and the spaces 41 are closed due to a heavy load on the assembly.

A clearance 55 is provided between king pin 12 and the opening in the intermediate plate 14 to allow pumping of fluid 53 to the O-rings 48. The encircling extension 50 retains a reservoir of the oil 53 about the small O-rings 48.

An oil inlet tube 56 is secured to the lower portion of cylinder 11 and extends vertically upwardly adjacent the front of axle enlargement 7. The outer end of the tube 56 is disposed generally at the predetermined oil level to be provided within the shock assembly 4 and serves as a guide in filling the assembly. A cap 57 threads onto the end of the tube 56 to seal the tube.

A flexible annular boot 58 of neoprene or the like seals the joint between the sliding surfaces of cylinders 10 and 11 to prevent dust and other foreign matter from entering between bearing 17 and cylinder 10. The flexible boot 58 is secured at its upper end by a clamp ring 59 which encircles the upper end of cylinder 11 immediately adjacent the mounting plate 18. The lower end of boot 58 encircles an upstanding leg of an L-shaped flange 60 which is rigidly secured to the upper edge of the cylinder 10. A channel-shaped slip ring 61 is disposed over the upstanding leg of the flange 60 and is bolted to a slip ring retainer 62 which extends beneath the flange 60 to secure the slip ring 61 in sliding engagement to the upstanding leg of the flange 60. A clamping ring 63 encircles the lower end of the boot 58 and clamps the boot to the slip ring 61 to effect the seal between the sliding and relatively rotating surfaces of cylinders 10 and 11.

In operation, the vertical and the lateral shocks are absorbed by either or both of the concentric resilient stacks of members 28 and 29 and the lateral shock is also absorbed by the sleeve bearing 17. Under light load conditions, the inner stack of members 28 supports the body 1 and the load on the relatively small area of a member 28. This provides a smooth suspension of the body portion. However, as the load increases the cylinder 11 is depressed into the relatively stationary cylinder 10 and the plate 14 engages the outer stack of members 29. This provides an increased surface area for the heavier loads and reduces the unit loading. It also eliminates the tendency of the resilient members 28 and 29 to permanent set.

The individual action of the resilient members due to the metal facings 30, 31, 39 and 40 also serves to eliminate the tendency to permanent set of the members 28 and 29.

Further, resilient members 28 and 29 are radially unrestrained and freely deform in a radial direction. This both increases the life of the members and the reproduceability of the load deflection pattern.

The rectangular cross-sectional area of the members 28 and 29 and the separating metal facings allow the shape factor of the members to be employed to accurately design and predict the final load deflection curve.

Further, by employing successively active resilient units a predetermined non-linearity can be designed into the shock system. The use of rubber of a varying firmness in different layers may also be employed to control the load deflection curve.

Although the suspension system shown is for a turnable front wheel assembly for a trailer, the invention may be readily adapted to individual suspensions for either front or rear wheels. Further, the suspension system may be adapted for the suspension of vehicles other than road vehicles such as railroads and the like.

The separate metal facings for the adjoining surfaces of the resilient O-ring members may be replaced with a single metal facing bonded on its opposite surfaces to the adjacent surface of the resilient O-ring members.

Although the inner and outer stacks of members 28 and 29 are shown having a similar number of individual members, a different number may be employed by suitably adjusting the vertical depth of the members.

The present invention provides a suspension system having a long life and good reproduceability of load deformation patterns. The suspension system is also relatively simple and is easily fabricated.

Various modes of carrying out the invention are contemplated as being within the scope of the following claim particularly pointing out and distinctly claiming the subject matter which is regarded as the invention.

We claim:

In a vehicle shock assembly for supporting a vehicle body on the axle of the vehicle, a lower cylindrical member integrally secured to the axis of the vehicle and having a lower bearing wall, an upper cylindrical member secured to the vehicle body and telescoped into the lower cylinder to allow relative vertical movement between the vehicle body and the axle, a sleeve bearing interposed between the sliding walls of said cylinders and bonded to one of said cylinders, said sleeve bearing being formed of a resilient material to absorb lateral shock, a plurality of superimposed similar O-ring members of resilient material concentrically disposed within said cylinders and resting on the lower bearing wall of said lower cylinder, a bearing wall secured intermediately within said upper cylinder and resting on the upper end of the O-ring members to resiliently support said vehicle body on said axle, said O-ring members having a rectangular cross-section with generally horizontal upper and lower surfaces and having upper and lower metal facings bonded thereto, a coupling bolt passing coaxially through said cylinders and spaced from said O-ring members to limit expansion of the cylinders, a plurality of superimposed similar O-ring members of resilient material concentrically disposed within said cylinders between said horizontal walls and encircling said first named O-ring members and being radially spaced from said first named O-ring members and said cylinder walls, said second named O-ring members having a rectangular cross-section and having upper and lower metal facings bonded thereto, said O-ring members being completely radially spaced from all adjoining vertical surfaces to establish free and unrestrained deformation in the radial direction, said second named members having a vertical dimension less than said first named members, means to connect said lower metal facings to maintain said metal facings in a common plane to support said second named members in the absence of a predetermined load on said vehicle, and cooperating annular grooves and ridges in the adjacent metal facings in said first stack of O-ring members to lock the adjacent facings against relative lateral movement.

References Cited in the file of this patent

UNITED STATES PATENTS

| | | |
|---|---|---|
| 1,098,598 | Todd | June 2, 1914 |
| 2,445,723 | Brown | July 20, 1948 |
| 2,573,108 | Piron | Oct. 30, 1951 |
| 2,713,485 | Tillou | July 19, 1955 |
| 2,733,916 | Dentler | Feb. 7, 1956 |
| 2,764,300 | Withall | Sept. 25, 1956 |
| 2,859,978 | Brimhall | Nov. 11, 1958 |